JOHN G. BAKER.

Improvement in Steam-Traps.

No. 126,007. Patented April 23, 1872.

WITNESSES: Thomas M. Swain, John Parker

John G. Baker
by his Att'ys
Howson and Son

126,007

UNITED STATES PATENT OFFICE.

JOHN G. BAKER, OF PHILADELPHIA, PENNSYLVANIA.

IMPROVEMENT IN STEAM-TRAPS.

Specification forming part of Letters Patent No. 126,007, dated April 23, 1872.

Specification describing an Improvement in Steam-Traps, invented by JOHN G. BAKER, of Philadelphia, Pennsylvania.

*Improvement in Steam-Traps.*

My invention relates to that class of steam-traps in which the expansion and contraction of an inner tube in excess of that of an outer tube, caused by the difference in the temperature of the two tubes, so operates a valve as to permit the water to escape from the inner tube, and to close the latter when steam only is present; and my invention consists, first, of the interposition between the tubes of fire-clay or other equivalent non-conducting material, so as to render the instrument more decided and more sensitive in its action, as fully explained hereafter. My invention also consists of a yielding valve-seat, in combination with other adjuncts, described hereafter, for preventing the inner tube from being injured by continued expansion.

Figure 1:
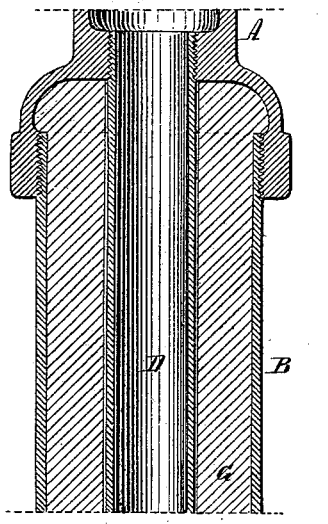
Figure 2:
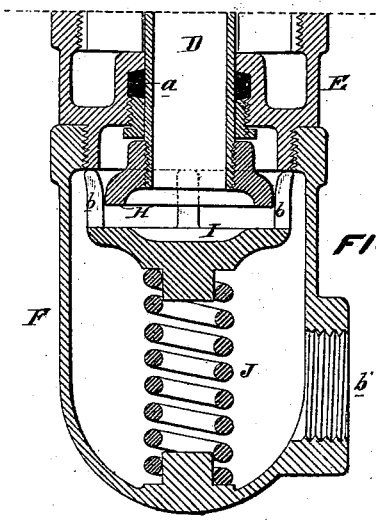
Figure 3:
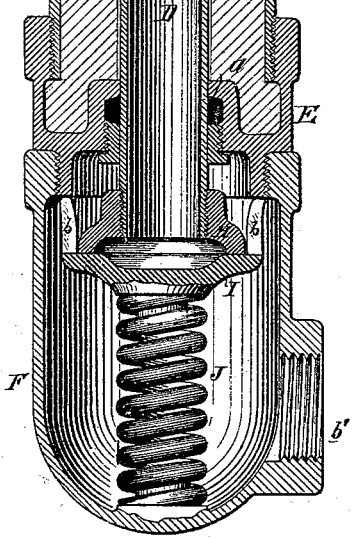
Figure 3:
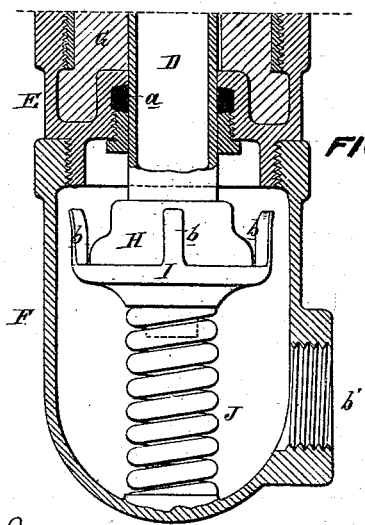

In the drawing, Figure 1 is a longitudinal section of my improved steam-trap; and Figs. 2 and 3, sectional views of parts of the same, showing the valve and seat in different positions.

A is a socket, to be connected to the termination of a steam heating-coil; and into this socket are screwed the ends of the outer tube B and inner tube D, the former being screwed into a socket, E, and the tube D passing through a stuffing-box, $a$, formed within the said socket, to which is secured a casing, F, having an outlet-branch, $b'$. The space G between the two casings is packed with fire-clay or other equivalent non-conducting material. The outer end of the tube D is furnished with a valve, H, adapted to a seat, I, both being contained within the casing F, a strong spiral spring, J, also within the said casing, tending to maintain the legs $b$ of the seat in contact with the end of the socket E, as shown in Figs. 1 and 2.

As long as the steam alone remains in the tube D the heat will expand the latter, and the valve H will remain in contact with the seat I, which yields to the expansion, the valve H thus remaining closed to its seat, no matter what may be the difference in length between the tubes. Owing to this yielding valve the inner tube cannot be buckled or strained, and thereby lose its sensitiveness—a result which is frequent when the valves of steam-traps bear against fixed seats. The pressure of water in the tube D will cause the latter to contract, and the valve H will be, consequently, drawn inward, followed by its seat, until the legs $b$ of the latter come in contact with the end of the socket E, when, owing to the continued contraction of the inner tube, the valve will leave its seat and permit the water to escape into the casing F, and thence through the outlet $b'$.

One of the most important features of my invention is the packing of fire-clay or other equivalent material between the two tubes. While this packing is such that it does not interfere with the free expansion and contraction of the inner tube, the difference between the temperature of the latter tube and that of the outer tube is always so great that a more decided and sensitive action of the instrument is secured than if the space between the two tubes were empty.

I claim as my invention—

1. A steam-trap, between the two tubes of which intervenes a packing of fire-clay or other equivalent non-conducting material, as set forth.

2. The valve H, attached to the tube D, the seat I, with legs $b$, and the spring J, all combined with each other and with the casing F, substantially as set forth.

In testimony whereof I have signed my name to this specification in the presence of two subscribing witnesses.

JOHN G. BAKER.

Witnesses:
WM. A. STEEL,
JOHN K. RUPERTUS.